United States Patent [19]

Dussud

[11] 4,403,811
[45] * Sep. 13, 1983

[54] APPARATUS FOR HANDLING LOADS BY MEANS OF A BALL BEARING-MOUNTED TABLE

[76] Inventor: Jean-Benoit Dussud, 12 rue Champ Rochas, 38240 Meylan, France

[*] Notice: The portion of the term of this patent subsequent to Dec. 1, 1998, has been disclaimed.

[21] Appl. No.: 220,700

[22] Filed: Dec. 29, 1980

[30] Foreign Application Priority Data

Jan. 14, 1980 [FR] France .................................. 80 00688

[51] Int. Cl.³ .............................................. F16C 29/06
[52] U.S. Cl. .............................. 308/6 C; 193/35 MD; 198/580
[58] Field of Search .............................. 198/472, 580; 193/35 MD; 308/6 C

[56] References Cited

U.S. PATENT DOCUMENTS 2,666,538  1/1954  Dooley .
3,046,913  7/1962  Wilson ................. 198/472
4,303,279  12/1981  Dussud ................. 193/35 MD

FOREIGN PATENT DOCUMENTS 211776   2/1957  Australia ............... 198/580
1559673  12/1967  France .
7834102  12/1978  France .
123458   6/1959  U.S.S.R. ............... 198/530

Primary Examiner—Andres Kashnikow
Assistant Examiner—Paul A. Sobel
Attorney, Agent, or Firm—Frishauf, Holtz, Goodman & Woodward

[57] ABSTRACT

An apparatus for handling loads by means of a ball bearing-mounted table is disclosed.

The ball bearings (3) are returned to the horizontal plate (1) of the table by means of an elevator with ball bearing holder (19), the upper surface of which is a polyurethane lining (34), which, by seating under the edge (2), is inclined and empties the ball bearing onto the plate (1).

10 Claims, 6 Drawing Figures

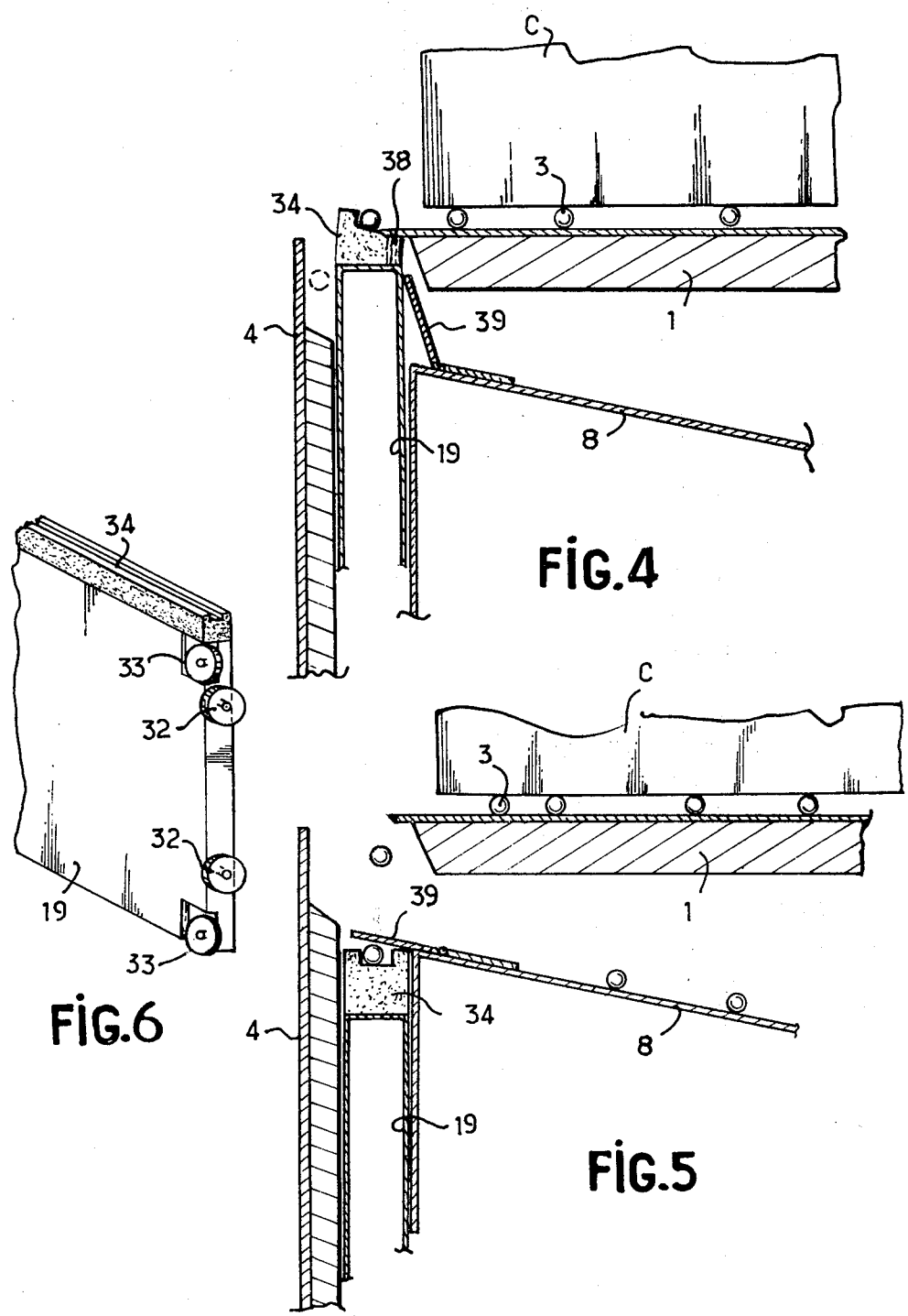

APPARATUS FOR HANDLING LOADS BY MEANS OF A BALL BEARING-MOUNTED TABLE

In French patent application No. 78 34102 which is not yet published, a load-handling apparatus is described, comprising a table having a horizontal plate on which ball bearings of the same diameter roll freely, this table being surrounded by a gully. Any ball bearings which fall into the gully are returned to the plate by a catapult.

It has been found that this catapult system has various disadvantages, such as:

the inpact of the ball bearings on the plate and on the walls of the chute through which they are propelled onto the tables makes the apparatus noisy, there are irregularities in the catapulting force, so that the ball bearings are not always catapulted uniformly, which may result in:

(a) one or more ball bearings falling onto the load (in the case of a thin object such as sheet metal), eventually causing some disruption for the operators of the handling equipment (b) one or more ball bearings hitting the load (side of a box) and rebounding so as to be thrown off the table and thus falling onto the ground. The presence of ball bearings lying on the ground constitutes a danger to the staff.

The invention remedies these disadvantages by providing an apparatus which operates relatively silently, wherein no ball bearings are lost, and which is very reliable, since it provides positive guiding of the ball bearings and does not catapult them in an uncontrolled manner, and thus provides an even better opportunity of mounting several apparatus side by side. Furthermore, the ball bearings in the apparatus can readily be replaced by ball bearings of different densities.

The invention relates to a load-handling apparatus, comprising a table having a horizontal plate on which ball bearings of the same diameter roll freely, a gully along the side of the table and a mechanism for returning any ball bearings which have fallen into the gully to the plate, characterised in that this mechanism is an elevating means which imparts to the ball bearings an acceleration even less than that of gravity, and which is provided with means for emptying the ball bearings onto the plate when it reaches the level of the plate.

It will be appreciated that the ball bearings no longer fall noisily back onto the plate in a scattered arrangement. The elevating means rises gently like a lift and, having reached the level of the plate, gently empties the ball bearings onto the plate without any appreciable speed, where the ball bearings stay in place better than they would if they had a certain initial velocity. The ball bearings stay at the edge of the plate, which must be better for receiving the particular load, since this load is immediately taken up by the ball bearings. As the ball bearings never reach a level above that of the load, there is no risk of their getting above the load.

According to a particularly simple and convenient embodiment, the means for emptying the ball bearings onto the plate when the elevating means reaches the level of the plate consists in the fact that the elevating means comprises a ball bearing holder made of a deformable elastic material and one of the edges of the ball bearing holder seats under one of the edges of the plate.

The emptying out of the ball bearings is thus effected automatically by the inclination of the upper surface of the ball bearing holder towards the plate.

In the known apparatus described in the above-mentioned document, a chute for catapulting the ball bearings is adjacent to the gully and it was therefore out of the question to take the risk of making the gully and the chute one and the same, since it is impossible to predict the point which would be reached by two colliding ball bearings, one of which is catapulted upwards while the other falls. It depends largely on the velocity of the catapulted ball bearing at the moment of impact. However, as soon as this catapulting is eliminated, the chute and gully may be made one and the same. The ball bearing holder moves in the gully. If it meets a descending ball bearing therein, it takes it back up onto the plate without projecting it, especially as the ball bearing holder is deformable and absorbs impact without causing the ball bearing to rebound, the elastic material of the ball bearing holder, e.g. conventional polyurethane foam, being soft without a strong elastic memory.

However, to avoid any danger of a ball bearing becoming lodged, for example, between the ball bearing holder and the plate, the following measures may be taken:

1. An arrangement is provided which compels the ball bearings to form a single row in each elevating means. For this purpose, a braking means may be provided, in particular, for the ball bearings located upstream of the point where the ball bearings enter the elevating means.

2. The lateral surface of the ball bearing holder is rendered rigid below the edge intended to cooperate with the edge of the plate. A ball bearing can no longer get in between the ball bearing holder and the wall of the gully.

3. A groove, dish or other means for receiving ball bearings and having a width slightly greater than the diameter of the ball bearings is provided on the upper surface of the ball bearing holder. The bearings are aligned in a row which does not pass under the edge of the plate, and the latter is advantageously also chamfered so as to open out upwardly.

4. The elevating means is arranged so that, as it moves upwardly, it displaces a shutter which closes the gully and is arranged on an extension of a frustum of a pyramid located below the plate and the gully is wider above the shutter than below it. If a ball bearing falls into the gully shortly before the ball bearing holder is emptied, one of the ball bearings temporarily moves into the trap formed by the tapering of the gully and, when the ball bearing holder comes down again, it rolls onto the shutter and returns to the ramp of the distributor.

It is important that the elevating means be accurately guided in its movement. For this purpose, according to one embodiment, the elevating means slides on rollers with perpendicular axes.

In the accompanying drawings, which are given solely by way of example:

FIGS. 2 to 4 are views of the left hand portion of FIG. 1 with the ball bearing holder, in its upward movement, being at the bottom, intermediate and top levels, respectively, FIG. 5 shows the ball bearing holder in an intermediate position as it descends again, and FIG. 6 is a partial perspective view of the elevating means.

Figure 1:
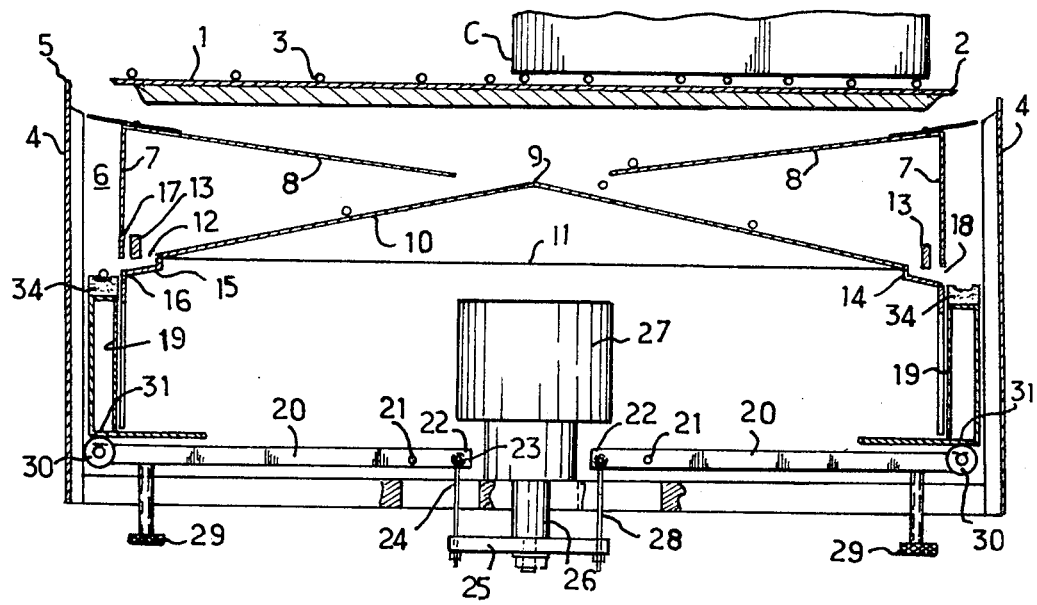
FIG. 1 is a sectional view of an apparatus according to the invention.

The apparatus comprises a table the horizontal plate 1 of which is square. The edges 2 of the plate 1 are bevelled so as to form surfaces inclined downwardly and inwardly.

The steel ball bearings of the same diameter rool freely on the plate 1. A load C to be handled rolls on the bearings 3.

At a distance from the periphery of the plate 1 which is more than the diameter of the ball bearings 3, four walls 4 are fixedly mounted on a frame (not shown), the upper edges 5 of said walls being at a level below the top of the ball bearings 3. These walls form gullies 6 with side walls 7 of the table, which are integral with the frame.

At a level which is below that of the plate 1 by at least the diameter of the ball bearings 3, four ramps 8 inclined towards the centre of the table start from the side walls 7, these ramps defining with one another, by means of their lower edges, an opening in which the top 9 of a distributor cone 10 fixed to the frame is located. The axis of the cone 10 passes through the point of intersection of the diagonals of the plate 1.

The long base 11 of the cone 10 extends as far as four slots 12 which are wider than the diameter of the ball bearings 3 but narrower than twice this diameter, these slots being defined by the long base and by stops 13 fixed to the frame. Adjoining the long base 11 there are substantially vertical shoulders 14 connected to inclined planes 15 the length of which is greater than the diameter of the ball bearings 3. The lower edges 16 of the inclined planes 16 define, with the lower edges 17 of the walls 7 or with the stops 13, slots 18.

Four elevator ball bearing holders 19 move into and out of the four gullies 6. The elevator means essentially comprises four levers 20. Each lever 20 pivots about an intermediate spindle 21 mounted on the frame. One end 22 of each lever 20 is held in a yoke 23 which is driven, via a rod 24, by a plate 25 integral with the shaft 26 of a jack 27 which moves upwards and downwards alternately. A nut device 28 makes it possible to modify the affective length of the rod 24 and hence the upward pivoting of the lever 20, whilst a screw 29 provides a means of regulating the bottom position of the lever 20.

The other end 30 of each lever 20 acts on the base 31 of the ball bearing holder 19 which slides in the gully 6, guided therein by rollers 32 having horizontal axes parallel to the edge 2, and by rollers 33 having horizontal axes perpendicular to the edge 2. (FIG. 6).

The upper edge of the ball bearing holder 19 has a lining 34 comprising a groove 35 which is parallel to the edge 2 and which is defined by an outer rim 36 and an inner rim 37. The width of the groove 35 is at least equal to the diameter of a ball bearing 3. It is less than twice this diameter.

The side surface 38 of the inner rim 36 is reinforced outside the ball bearing holder 19 by the application of a hardening adhesive.

The rim 36 is vertical with respect to the edge 2.

On each inclined ramp 8 there is articulated a shutter 39 which closes off the gully 6 on coming into contact with the ramp 8, urged by a recoil spring (not shown). Above this shutter 39, the gully 6 widens outwardly to form a trap 40.

Ball bearings are supplied to the table in the following manner: the ball bearings are distributed by the cone 10. Their velocity is arrested by the stop 13 and they arrange themselves into rows in front of the slot 18. Each row, which may possibly be incomplete, moves into the groove 35 (FIG. 2), whilst the rim 37 prevents two rows of ball bearings from being located on the ball bearing holder 19 at any one time, whilst the reinforcement of the surface 38 prevents a ball bearing from passing between the ball bearing holder 19 and the frame.

Figures 2, 3:
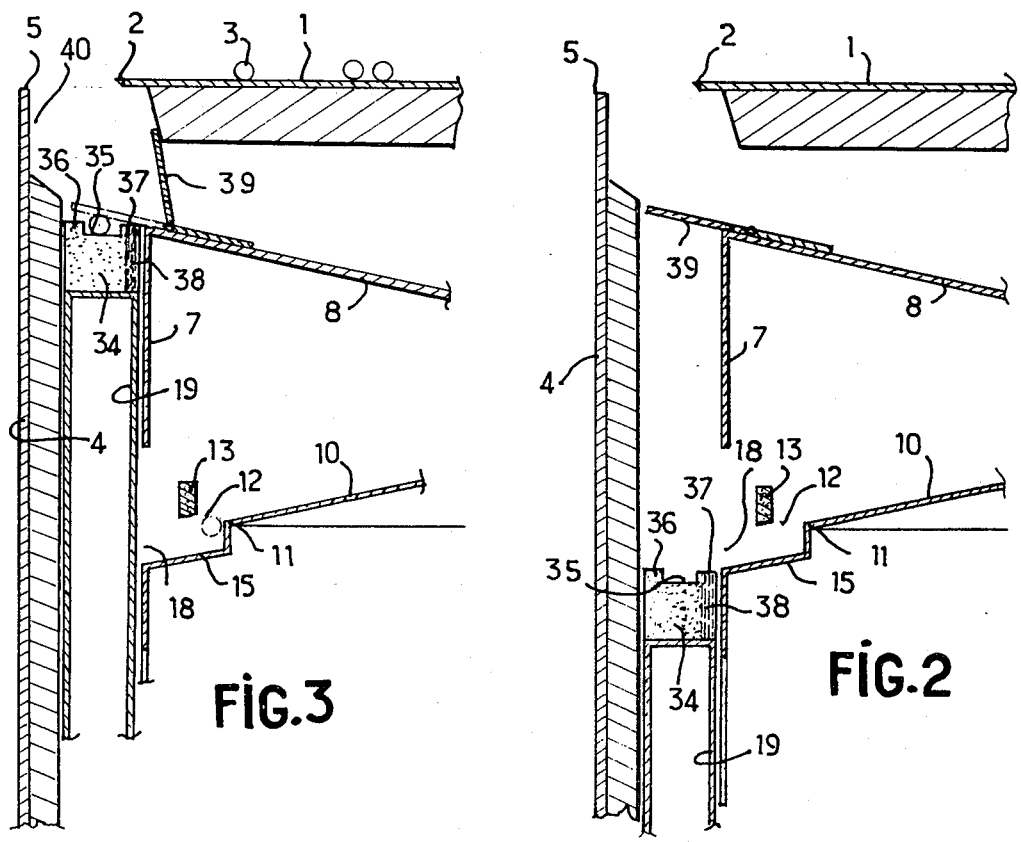

Under the action of the jack 26, 27, the levers 20 raise the ball bearing holders 19. As it moves, each ball bearing holder pushes back the shutter 39 (FIG. 3).

When the ball bearing holder 19 reaches the level of the edge 2, the upper surface of the lining 34 comprising the groove 35 is inclined laterally towards the inside of the table. The ball bearings (FIG. 4) roll gently onto the plate 1.

If, at this very moment, a ball bearing (FIG. 4) falls into the gully 6 or is carried along by a load (leaving the plate), it pushes a ball bearing contained in the ball bearing holder 19 into the trap 40.

When the elevating means descends again, the shutter 39 flaps back (FIG. 5) and the ball bearing trapped in the trap 40 can return to the ramp 8. The shutter 39 prevents any ball bearings which then fall into the gully 6 from moving directly onto the ball bearing holder 19 and thus jeopardising the row-by-row arrangement of the ball bearings thereon, this arrangement being essential to satisfactory operation of the apparatus without any ball bearings becoming jammed or falling out of the apparatus.

What is claimed is:

1. Load-handling apparatus, comprising a table having a horizontal plate on which ball bearings roll freely, a gully along the side of the table and a means for returning to the plate any ball bearings which have fallen into the gully, wherein said means for returning ball bearings comprises an elevating means, the movement of which is such as to prevent the ball bearings from continuing beyond substantially the level of the plate and which is provided with means for emptying the ball bearings onto the plate as the ball bearings reach substantially the level of the plate.

2. Apparatus according to claim 1, wherein the emptying means of the elevating means comprises a ball bearing holder made of a deformable elastic material and one of the edges of the ball bearing holder seats under one of the edges of the plate.

3. Apparatus according to claim 1 wherein the elevating means moves in the gully.

4. Apparatus according to claim 1, comprising an arrangement which forces the ball bearings to form themselves into a single row on each elevating means.

5. Apparatus according to claim 1, comprising braking means for the ball bearings, located upstream of the point where the ball bearings enter the elevating means.

6. Apparatus according to claim 2, wherein the side surface of the ball bearing holder beneath said edge is reinforced.

7. Apparatus according to claim 2, wherein the upper surface of the ball bearing holder has a groove, the width of which is slightly larger than the diameter of the ball bearings.

8. Apparatus according to claim 1 wherein, during its asscending movement, the elevating means displaces a shutter which closes off the gully and which is located on an extension of a frustum of a pyramid located beneath the plate.

9. Apparatus according to claim 8, wherein the gully is wider above the shutter than below it.

10. Apparatus according to claim 1, wherein the elevating means slides on rollers having perpendicular axes.

* * * * *